June 13, 1961 M. T. CICHELLI 2,987,765
PROCESS AND APPARATUS FOR FORMING TUBES
Filed July 7, 1960 3 Sheets-Sheet 1

INVENTOR
MARIO T. CICHELLI

BY Herbert M Wolfson
ATTORNEY

June 13, 1961 M. T. CICHELLI 2,987,765
PROCESS AND APPARATUS FOR FORMING TUBES
Filed July 7, 1960 3 Sheets-Sheet 3

INVENTOR
MARIO T. CICHELLI
BY Herbert M. Wolfson
ATTORNEY

United States Patent Office 2,987,765
Patented June 13, 1961

2,987,765
PROCESS AND APPARATUS FOR FORMING TUBES
Mario T. Cichelli, Wilmington, Del., assignor to E. I. du Pont de Nemours and Company, Wilmington, Del., a corporation of Delaware
Filed July 7, 1960, Ser. No. 41,328
7 Claims. (Cl. 18—14)

This invention relates to a process and apparatus for the forming of thermoplastics and, particularly, to a process for continuously forming tubular thermoplastic stock to a predetermined cross section by the use of gas pressure.

This application is a continuation-in-part of copending application Serial No. 797,373, filed March 5, 1959.

Tubular thermoplastic stock made from polymeric substances has hitherto been stretched by pulling over mandrels of progressively increased diameter, or by expanding the tubing by the introduction of a fluid under pressure to the interior of the stock and thereby stretching it radially outwards. Mechanical stretching is objectionable because the stock is brought into contact with the mandrel and the surfaces are thereby marred, particularly when the polymeric material is in the softened state, as is often the case. Also, rather high force application is necessary to draw the tubular stock over the expanding mandrel and this is deleterious to the web, as well as objectionable, in that heavy, expensive equipment is required. Expansion of tubes in a radial direction outwards through the agency of internally applied gas pressure is practicable; however, difficulties are encountered in supporting the film from the outside and this introduces a lack of control into the process.

In the devices disclosed in copending application Serial No. 797,373, the pitfalls of the prior art in expanding tubular thermoplastic stock are overcome by progressively advancing the tubular thermoplastic polymeric stock in process from a region of an initial limiting cross section to a region of a final limiting cross section while applying gas at superatmospheric pressure against the surface thereof in an amount sufficient to sustain the stock out of contact with the solid surfaces defining the limiting regions, and maintaining the temperature of the stock at levels necessary to form the thermoplastic to the desired final state. Maintenance of temperature is accomplished by heat transfer from the solid surfaces defining the limiting regions to the tubular stock through a very thin gas layer, generally 3–10 mils. The solid surfaces are brought to their desired temperature level by cooled or heated liquids flowing through coils embedded in the surfaces.

The preferred apparatus for stretching tubular thermoplastic stock while retaining a circular cross section is disclosed in application Serial No. 797,373. It consists of a sintered metal former supplying gas outwardly therefrom towards the thermoplastic tubing. The apparatus is disposed with its longitudinal axis vertical and consists of three sections aligned end to end. The first section, which receives the molten thermoplastic discharged from the annular die, is cylindrical in shape and the lower end abuts the small end of a frusto-conical stretcher section, the large end of which, in turn, abuts against one end of a second cylindrical section of a diameter approximating the final desired internal diameter of the thermoplastic product. Since the progress of the tubular stock is from the first section, over the stretcher section and thence out of the apparatus over the final section, the points of transition from one section to a neighboring section should be smooth and gradual. If desired, several sections may be made integral; however, from the standpoint of ease of fabrication as well as independent temperature maintenance in a given section and better control of the clearance between the stock and the former, it may be preferable to make up the sections as separate entities and insulate the points of juncture to minimize heat transfer by conduction from one section to another.

In addition, it was pointed out in application Serial No. 797,373 that in many practical instances it would be desirable to separate the porous surface sections from one another or into subsections in order to provide for annular gas withdrawal passages to prevent the excessive accumulation of gas along the length of the apparatus; an example of this separation by spool pieces 50 and 52 was provided in FIGURE 7 of application Serial No. 797,373. These annular gas withdrawal passages and the like comprise the main subject mattre of the present invention.

Specifically, the objects of this invention are to maintain uniform fluid pressure between a mandrel or shaping member and a freshly-extruded tubular thermoplastic film passing over but out of contact with the mandrel. The difficulty in maintaining uniform pressure is brought about by the tendency of the polymeric tubing to shrink during cooling coupled with the pumping action exerted by the moving tubular film on the gas between the tubing and the mandrel as the tubing passes over the mandrel. This combination of phenomena tends to build up the pressure of the gas at points downstream from the extrusion die. Any pressure built up downstream of the extrusion die reduces the flow of gas and may cause the tubing to expand excessively near the die where the tubing is weakest.

The present invention involves a process which comprises the steps, in sequence, of extruding a thermoplastic polymeric material in the form of molten tubing; advancing the tubing past the shaping surface of a mandrel, preferably over and around an internal mandrel; passing a gaseous medium into the region between the tubing and the mandrel at a rate sufficient to maintain the tubing in proximity to but out of contact with the mandrel surface; withdrawing gaseous medium at spaced intervals on the surface of the mandrel to avoid accumulating excess gaseous medium and to avoid distending the tubing away from its proximity to the mandrel surface, the spaced intervals beginning beyond the first point of maximum diameter of the shaping surface of the mandrel. It should be noted that if the shaping member or mandrel is made up of several sections, each section independently pressurized, then the point of maximum diameter refers to the point of maximum diameter of each section of the mandrel.

The apparatus for carrying out the process includes an extruder; a die having an annular orifice through which to extrdue thermoplastic material in the form of tubing; a substantially rigid shaping member or mandrel adapted to receive the tubing around the mandrel; means for advancing the tubing past the mandrel; means for supplying a gaseous medium within said tubing to sustain the tubing in proximity to but out of contact with the mandrel; and at least one pressure relief outlet disposed on the surface of the mandrel beyond the first point of maximum diameter of the mandrel, the pressure relief outlet adapted to transfer accumulated gas from the interior of the tubing to maintain the gas pressure at a predetermined value.

The pressure relief outlets in the shaping member or mandrel may comprise spaced annulae, porous areas, holes, or combinations thereof connected to suitable conduits. They may be connected through the interior of the mandrel, directly or indirectly to the atmosphere or to a vacuum source or to any outlet maintained at a pressure lower than the desired uniform pressure maintained between the tubing and the mandrel. The apertures are preferably arranged in an annular series or band extending around the periphery of the mandrel transverse to the direction of the advancing polymeric tubing.

The thermoplastic characteristics of the polymer used and the properties of the polymeric film extruded determine the specific dimensions of the internal mandrel as well as the distance that the mandrel is spaced from the die. For most polymers, the mandrel may be located adjacent the die and preferably not more than two feet from the face of the die. Being designed to provide heat transfer to or from the tubular film, the mandrel usually contains coils for conveying heating or cooling fluid. As a shaping member, the mandrel is designed to approximate the contour of the polymeric tubing that passes over it. The nose portion of the mandrel may take the form of a frusto-conical section with varying degrees of pitch or it may be hemispherical. Such geometry provides a gradual increase in the diameter of the tubing while the tubing is being cooled. If the increase in diameter were not gradual, then there is a tendency for the molten film to rupture.

The total length of the mandrel will vary with the particular heat transfer requirements and/or the desired diameter increase. It should be understood that each section of the mandrel may be considered as an individual mandrel having its own temperature regulating means. Thus, one temperature can be used in the mandrel section where the film is still molten and another temperature used in the section where the film is stretched and still another temperature used in any mandrel section where film shrinkage is permitted.

The internal mandrels designed in accordance with the present invention may be constructed of any suitable thermally conductive material. Metals, particularly lighter metals such as aluminum, are preferred. The finish on the surface of the mandrel is not critical. However, it is preferred that this surface be smooth to minimize turbulence of the gaseous medium flowing between the surface of the mandrel and the polymeric tubing.

This invention will be more clearly understood by referring to the following detailed description and the drawing, in which.

Figure 1:
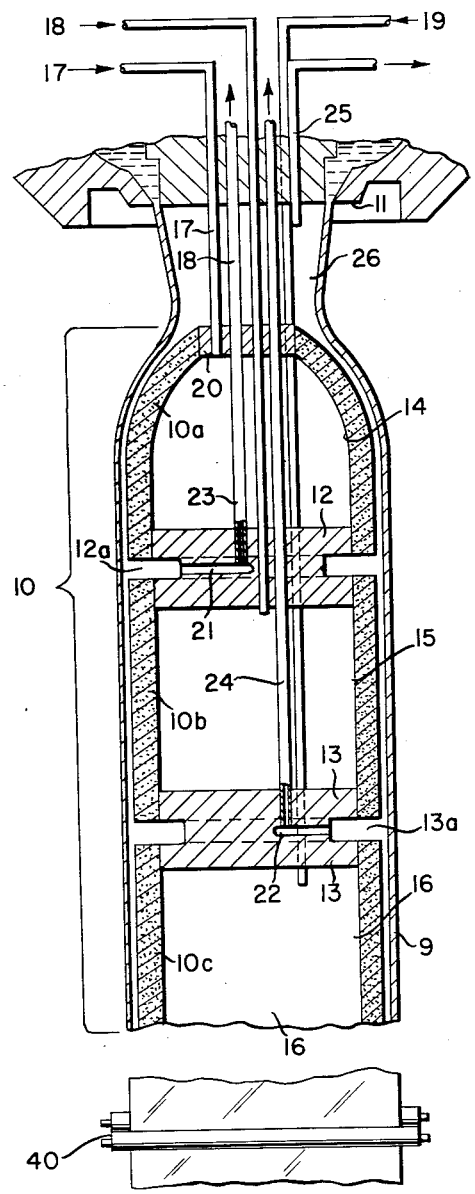
FIGURE 1 is a partially schematic view in longitudinal section of a preferred embodiment of an apparatus according to this invention adapted to stretch tubular thermoplastic polymeric stock.

The preferred apparatus, as shown in FIGURE 1, is composed of an annular die 11 through which the tubular thermoplastic film 9 is extruded. The film 9 is advanced over the internal mandrel 10 by a pull roll set 40 located beyond the mandrel. The mandrel, having a porous wall, is made up of a porous nose section 10a and sections 10b and 10c. The sections are connected by spool-like separators 12 and 13 having annular grooves 12a and 13a, respectively. The separators permit the chambers 14, 15 and 16 within each mandrel section to attain different gas pressures. The gas pressures are obtained by gas flowing into chambers 14, 15 and 16 through air feed lines 17, 18 and 19. The closure 20 prevents the escape of gas, other than through the porous surfaces, from chamber 14.

In a typical apparatus, the walls of the mandrel sections are fabricated from one-half inch thick sintered bronze metal having a porosity of about 20% on the volumetric basis, which permits the passage of about 5 cu. ft./min. of air per square foot of metal surface at a pressure of 5 p.s.i. gauge differential across the metal.

Instead of sintered metal, other gas-pervious structures may be employed. For example, aggregates of small metal balls the size of birdshot point-welded or soldered together can provide throughgoing air passages that are relatively uniform in size and distribution. Sintered wire matrices or pervious metal-ceramic composites may also be used. Instead of air as the gaseous medium used, nitrogen, argon or any gas that is substantially inert toward the polymeric tubing may be used.

The annular grooves 12a and 13a in the separators 12 and 13 communicate through channels 21 and 22 and conduits 23 and 24 with the atmosphere. As mentioned before, communication may be with any space containing gas at a pressure lower than that desired in the area between the tubing and the mandrel. Thus, the grooves 12a and 13a, in combination with channels 21, 22, 23 and 24, provide pressure relief outlets for the space between the mandrel 10 and the tubular film 9. These pressure relief outlets, it will be noted, are located beyond the initial point of maximum diameter of each mandrel section. Thus, for section 10a, the outlets are located beyond the point where the tapered nose section becomes cylindrical. By this positioning, the operator is assured that the mandrel will have a cushion of sufficient gas to maintain the passing film out of contact with the shaping surface, and that the accumulated gas is not removed until the initial point of maximum diameter has been passed.

Heating and cooling coils may be arranged in any or all of the mandrel sections 10a, 10b and 10c, if desired, and as shown in greater detail in application Serial No. 797,373. The air pressure relief line 25 extends through the die 11 and serves to vent the space 26 within the tubing to prevent bulging of the tubing while the tubing has not hardened sufficiently to resist deformation by slight increases in gas pressure.

The gas flowing through the porous mandrel serves to support the tubing, providing a thin gas layer, 3–10 mils, through which heat is transferred between the tubing and the mandrel. At no point does the thermoplastic tubing touch the surface of the mandrel. Any excessive pressure that may build up within the thin gas layer is vented through the pressure relief outlets and a tubular film substantially free of marring, wrinkling, distortion and gauge variation is produced.

Figure 2:
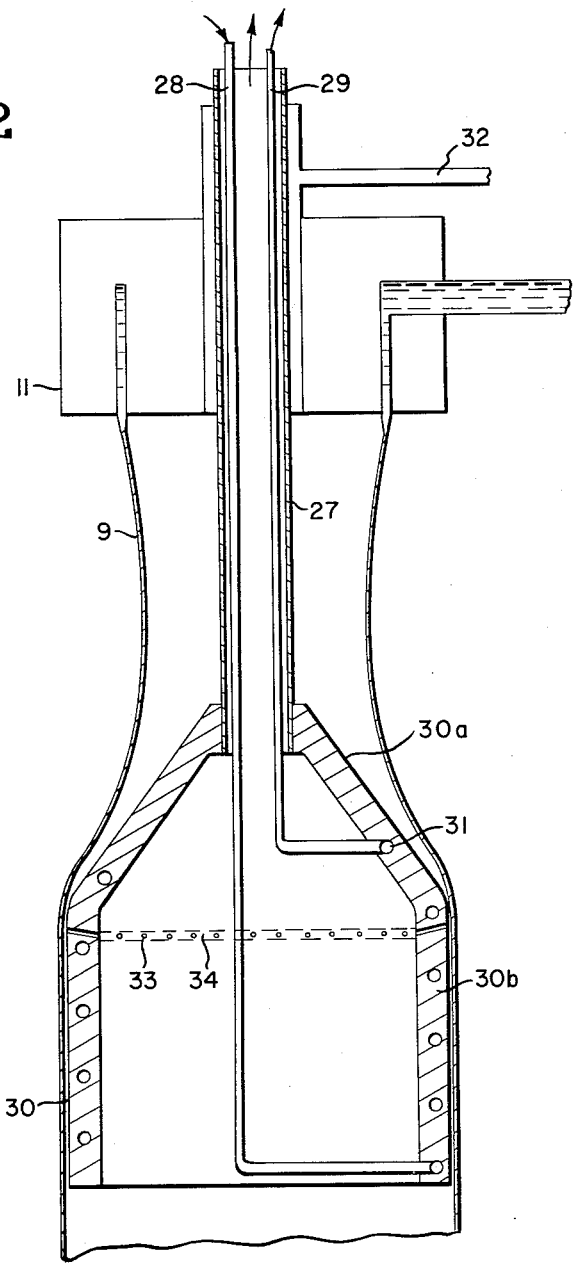
FIGURE 2 is a partially schematic view in longitudinal section of another embodiment of an apparatus according to this invention.

In FIGURE 2, a non-porous, hollow mandrel 30 having a smooth surface and a circular cross section is shown. The mandrel is suspended a distance of about ten inches from the face of the die 11 by being welded to a hollow support post 27, the latter adapted to fit through the center of the die. The mandrel is composed of a frusto-conical section 30a, the narrow end of which faces the die and the cylindrical section 30b. The wall of the mandrel is approximately two inches thick with a coil 31 embedded therein. Cooling fluid is passed through the coil, the fluid being fed in at the inlet 28 and passing out the outlet 29.

In operation, polymeric material is extruded through the annular opening of the die 11 in the form of a tubular film 9. As the film cools in the space between the die and the mandrel, the film tends to shrink. Air or another gaseous blowing medium is introduced under pressure through the feed line 32. The gas serves to expand the film to a predetermined diameter that is slightly larger (up to 20 mils larger) than the maximum diameter of the mandrel. As the film is advanced over the mandrel by a conventional set of pull rolls, shown in FIGURE 1 but not shown in FIGURE 2, gas is drawn by the moving film into the space between the film and the mandrel. To prevent undue expansion of the film, excess gas is vented through a series of holes 33 spaced about one inch apart in the wall of the mandrel, which holes communicate with the hollow interior of the mandrel. Although a single row of holes 33 is shown in FIGURE 2, any number of rows may be used. The rows are preferably located in circumferential grooves 34.

From the interior of the mandrel, the gas is passed through the hollow support post 27 to the atmosphere or any other area maintained at a slightly lower pressure than the gas within the tubular film. As an alternative, the pressure relief holes 33 need not communciate with the hollow interior of the mandrel. Instead, the mandrel may be constructed with a thicker wall in which are drilled longitudinal openings communicating with the atmosphere. This alternative would provided a slightly more flexible operation.

Figure 3:
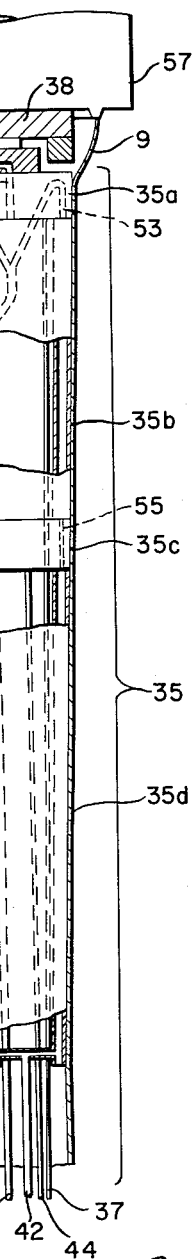
FIGURES 3 and 4 are partially schematic views in longitudinal section of other embodiments of apparatus wherein the tubular thermoplastic polymeric stock is not stretched.

In FIGURE 3, a tapered mandrel 35 for cooling is shown. The mandrel is composed of four sections:

(1) 35a, a porous section that communicates with an air inlet 36.

(2) 35b, a solid cooling section.

(3) 35c, a porous section that communicates with a vacuum source 44 (the pressure relief area).

(4) 35d, a solid section for additional cooling.

In operation, the polymeric material is extruded through the annular opening of a rotating die 57 in the form of a tubular film 9. The mandrel 35 is insulated from the hot die by means of an insulating disc shown at 38. The film 9 necks down to a diameter within 20 mils of the diameter of the section 35a of the mandrel. Air or similar gas is led through inlet 37 to mandrel section 35a. The gas emerging from this porous section serves to keep the film in proximity to but out of contact with the mandrel. Excess air that accumulates in the region between the face of the die and the mandrel is vented to the interior of the mandrel through tube 43, from where it vents to the atmosphere through passages not shown. Section 35c, composed of porous bronze, is maintained under a vacuum by communication with a vacuum line 44. Excess gas that tends to accumulate and prevent the further flow of gas past the area of excessive accumulation is removed through this porous section and into the vacuum line 44. Cooling of the film is accomplished primarily in sections 35b and 35d by means of the cooling liquid flowing in at 41 and passing through annulus 39 adjacent the surface of sections 35b and 35d and the tubes 52, 53, 54 and 55 in sections 35a and 35c before passing out at 42.

Figure 4:
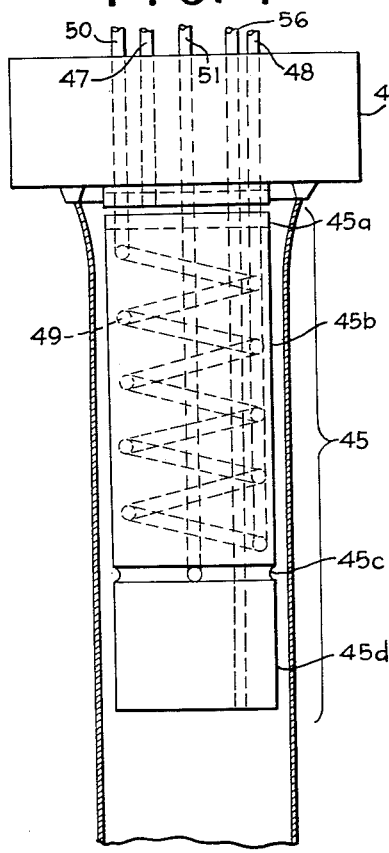

In FIGURE 4, the mandrel 45 is shown suspended from the face of a circular die 46. The mandrel 45 is composed of four sections:

(1) 45a, a porous section for supplying air from, or venting air to the atmosphere.

(2) 45b, a solid tapered cooling section.

(3) 45c, an annular area, about ten mils wide, communicating with a vacuum for withdrawing air.

(4) 45d, a solid tapered section.

In operation, polymeric material such as molten polyethylene terephthalate or polyvinyl chloride is extruded through the annular opening of the die 46. Air may be brought in through inlet 47 sufficient to prevent undue shrinkage of the tubular film. The film is advanced over the mandrel by a set of pull rolls not shown. Cooling water flows in at 48, passes through coil 49 and out at 50 to cool the film to any desired temeprature for subsequent expansion. Expansion of the film takes place immediately after section 45d of the mandrel by means of gas supplied at a high pressure through supply line 56. Excessive gas is prevented from flowing backward by the pressure relief annulus 45c. Most of the excess gas is removed through this annulus to a vacuum source 51. It is desirable to use a vacuum and an annular area sufficient to maintain the pressure at this location substantially at atmospheric pressure. If the pressure is greater than atmospheric and also greater than the pressure created by the pumping action of the tubular film advancing over the cylindrical mandrel from the die, then air will flow toward the die and the opening shown at 47 will then become a vent for excess air to pass from the system. In any case, premature expansion of the tubing is prevented.

The thermoplastic polymers with which the process of this invention is particularly concerned are any organic thermoplastic polymeric materials that may be successfully extruded in tubular film form. The following examples of organic polymers are particularly suited for use on the apparatus described:

(1) Polymers that are normally amorphous (those that do not crystallize) such as polystyrene and polymethyl methacrylate.

(2) Polymers that are "crystallizable" or can be made to crystallize but which can be quenched in an essentially amorphous state (for instance, polyesters and polyamides), such as polyethylene terephthalate, copolyesters of ethylene terephthalate/ethylene isophthalate wherein the ethylene terephthalate component is at least 65%, by weight, of the total composition, polyethylene-2,6-naphthalate, polytetramethylene-1,2-dioxybenzoate, polyethylene - 1,5-naphthanate, polyhexamethylene adipamide, polyhexamethylene sebacamide and polycaproamide. Polyvinyl chloride is another example of this type of suitable polymer.

(3) Polymers that are normally crystalline and that cannot normally be quenched from a melt in an essentially amorphous (non-crystalline) form, such as polyethylene (low, intermediate and high density types), polypropylene, polyvinyl fluoride and polyoxymethylene.

(4) Cellulosic films such as regenerated cellulose. For instance, viscose (an alkaline solution of cellulose xanthate) of relatively high viscosity may be extruded from a circular die and formed in accordance with the present invention to produce regenerated cellulose film in tubular form.

From the foregoing it will be apparent to persons skilled in the art that this invention is capable of relatively wide modification without departure from its essential spirit, wherefore it is intended to be limited only by the scope of the following claims.

I claim:

1. A process comprising the steps, in sequence, of extruding thermoplastic polymeric material in the form of molten tubing; advancing said tubing past the surface of a mandrel; passing a gaseous medium into the region between the surface of the mandrel and the tubing at a rate sufficient to maintain the tubing in proximity to but out of contact with the surface of said mandrel; and withdrawing gaseous medium at spaced intervals along said surface of the mandrel, said spaced intervals beginning beyond the first point of maximum diameter of the mandrel whereby accumulation of excess gaseous medium and excessive distention of the tubing away from proximity to the surface of the mandrel is avoided.

2. A process as in claim 1 wherein said region between the surface of the mandrel and the tubing has a thickness of 3–10 mils.

3. A process as in claim 1 wherein the mandrel is at a lower temperature than the temperature of the tubing.

4. A process as in claim 1 wherein the gaseous medium is withdrawn into the interior of the mandrel and thence to the atmosphere.

5. An apparatus comprising an extruder; a die in said extruder having an annular orifice through which to extrude thermoplastic material in the form of tubing; a substantially rigid mandrel adapted to receive the tubing around said mandrel; means for advancing the tubing past said mandrel; means for supplying a gaseous medium within said tubing to sustain said tubing in proximity to but out of contact with said mandrel; and at least one pressure relief outlet disposed on the surface of the mandrel beyond the first point of maximum diameter of said mandrel, said pressure relief outlet adapted to transfer accumulated gas from the interior of the tubing to maintain the pressure of the gas at a predetermined value.

6. An apparatus as in claim 5 wherein said mandrel is hollow and said pressure relief outlet is composed of gas-pervious areas of porous material adapted to convey gas to the interior of said hollow mandrel.

7. An apparatus as in claim 5 wherein said mandrel is hollow and said pressure relief outlet is composed of spaced annular apertures in said mandrel communicating with the interior of said hollow mandrel.

References Cited in the file of this patent

UNITED STATES PATENTS

| | | |
|---|---|---|
| 2,387,886 | Devol | Oct. 30, 1945 |
| 2,519,375 | Jargstarff et al. | Aug. 22, 1950 |
| 2,632,205 | Harris | Mar. 24, 1953 |